US009098951B2

(12) United States Patent
Nieten et al.

(10) Patent No.: US 9,098,951 B2
(45) Date of Patent: Aug. 4, 2015

(54) INDICATOR OF ESTIMATED SPRING LIFE AS WELL AS GAS SPRING ASSEMBLY, SYSTEM AND METHOD

(71) Applicant: Firestone Industrial Products Company, LLC, Indianapolis, IN (US)

(72) Inventors: Jason D. Nieten, Noblesville, IN (US); Pradipta N. Moulik, Carmel, IN (US); Michael C. Howard, Noblesville, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 0 days.

(21) Appl. No.: 14/042,121

(22) Filed: Sep. 30, 2013

(65) Prior Publication Data

US 2014/0095015 A1 Apr. 3, 2014

Related U.S. Application Data

(60) Provisional application No. 61/707,052, filed on Sep. 28, 2012.

(51) Int. Cl.
*G07C 5/00* (2006.01)
*G06F 17/13* (2006.01)
(Continued)

(52) U.S. Cl.
CPC .................. *G07C 5/00* (2013.01); *B60G 11/27* (2013.01); *B60G 11/28* (2013.01); *G06F 17/13* (2013.01); *G07C 3/00* (2013.01); *G05B 23/00* (2013.01)

(58) Field of Classification Search
CPC ....... G60G 11/27; G60G 11/28; G05B 23/00; G06F 17/13; G07C 5/00; G07C 3/00
USPC .................. 701/31.9; 280/5.514, 5.508, 5.51, 280/124.16
See application file for complete search history.

(56) References Cited

U.S. PATENT DOCUMENTS 5,412,584 A * 5/1995 Umeno et al. ................ 702/140
5,775,677 A * 7/1998 Englund .................... 267/64.11
(Continued)

FOREIGN PATENT DOCUMENTS

DE 10 2010 016 737 A1 5/2010
WO WO 2009/089600 A1 7/2009

OTHER PUBLICATIONS

Rui Li, Weimin Chen, Miao Yu, Changrong Liao, Yinguo Li, "Research on Vehicle Magneto-rheological Suspensions Vibration Control and Test," Publication Year: 2006 , pp. 902-907.*
(Continued)

*Primary Examiner* — Tuan C. To
(74) *Attorney, Agent, or Firm* — Jason A. Houser; Fay Sharpe LLP

(57) ABSTRACT

An indicator of an estimated remaining life of an associated spring device can include at least one sensor and at least one processor. The at least one sensor can be operative to generate a signal having a relation to at least one of a usage condition and an environmental exposure condition of a spring device. The at least one processor can be communicatively coupled with the at least one sensor and programmed to receive signals from the at least one sensor, derive data from the received signals, and determine an estimated remaining life of at least the spring device using the data and an expression modeling a relationship between an estimated remaining life of the spring device and at least one of a usage condition and an environmental exposure condition. A gas spring and indicator assembly, a suspension system and a method are also included.

20 Claims, 5 Drawing Sheets

(51) Int. Cl.

| | |
|---|---|
| ***B60G 11/27*** | (2006.01) |
| ***B60G 11/28*** | (2006.01) |
| ***G07C 3/00*** | (2006.01) |
| *G05B 23/00* | (2006.01) |

(56) References Cited

U.S. PATENT DOCUMENTS

| | | | | |
|---|---|---|---|---|
| 5,794,966 | A * | 8/1998 | MacLeod | 280/5.507 |
| 6,811,167 | B2 * | 11/2004 | Coombs et al. | 280/124.154 |
| 7,036,835 | B2 * | 5/2006 | Coombs et al. | 280/124.154 |
| 7,621,538 | B2 | 11/2009 | Nordmeyer et al. | |
| 7,644,933 | B2 * | 1/2010 | Brookes et al. | 280/5.502 |
| 7,644,943 | B2 * | 1/2010 | Hayes et al. | 280/124.157 |
| 7,717,212 | B2 * | 5/2010 | Weagle | 180/227 |
| 7,729,829 | B2 * | 6/2010 | Messih et al. | 701/37 |
| 7,813,850 | B2 | 10/2010 | Mannerfelt | |
| 8,733,743 | B2 * | 5/2014 | Koeske | 267/64.27 |
| 8,979,077 | B2 * | 3/2015 | Street et al. | 267/64.27 |
| 2004/0129168 | A1 * | 7/2004 | Forbes | 105/197.05 |
| 2007/0114706 | A1 * | 5/2007 | Myers | 267/64.27 |
| 2007/0126163 | A1 * | 6/2007 | Leonard et al. | 267/64.27 |
| 2008/0246198 | A1 * | 10/2008 | Levy et al. | 267/124 |
| 2008/0284072 | A1 * | 11/2008 | Hayes et al. | 267/119 |
| 2011/0035105 | A1 | 2/2011 | Jolly | |
| 2012/0059544 | A1 * | 3/2012 | Kinoshita et al. | 701/22 |
| 2012/0267836 | A1 * | 10/2012 | Street et al. | 267/64.27 |
| 2013/0300074 | A1 * | 11/2013 | Koeske et al. | 280/6.157 |

OTHER PUBLICATIONS

Nenov, N.G., Dimitrov, E.N., Ruzhekov, T.G., Georgiev, E., “System of Hydraulic Dampers Diagnostics,” Publication Year: 2006 , pp. 225-228.*

* cited by examiner

INDICATOR OF ESTIMATED SPRING LIFE AS WELL AS GAS SPRING ASSEMBLY, SYSTEM AND METHOD

This application claims priority from U.S. Provisional Patent Application No. 61/707,052 filed on Sep. 28, 2012, which is hereby incorporated herein by reference in its entirety.

BACKGROUND

The subject matter of the present disclosure broadly relates to the art of spring devices and, more particularly, to an indicator for determining and/or communicating an estimated remaining life of a spring device or component thereof. Such a system can be included in or otherwise operatively associated with one or more of a gas spring assembly, a control system, a suspension system and/or a method of operation.

The subject matter of the present disclosure may find particular application and use in conjunction with gas spring assemblies of wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in conjunction with gas spring assemblies of non-wheeled vehicles, support structures, height adjusting systems and actuators associated with one or more of industrial machinery, components thereof and other such equipment. Accordingly, the subject matter of the present disclosure is not intended to be limited to use associated with gas spring assemblies of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system includes a plurality of spring devices, as well as a plurality of damping devices, disposed between the sprung and the unsprung masses that together permit the sprung and unsprung masses of the vehicle to move in a somewhat controlled manner relative to one another. Movement of the sprung and unsprung masses toward one another is normally referred to in the art as jounce motion, while movement of the sprung and unsprung masses away from one another is commonly referred to in the art as rebound motion.

The plurality of spring devices of a suspension system of a vehicle can, in some cases, be of the type and kind referred to as gas spring assemblies that include a flexible sleeve or bellows. In many cases, the flexible sleeve or bellows includes a flexible wall that is formed from an elastomeric material (e.g., natural rubber, synthetic rubber, thermoplastic elastomer). Often, the flexible wall will include one or more layers or plies of elastomeric material with one or more layers or plies of reinforcing material embedded therein. Regardless of the construction, however, the flexible sleeve or bellows at least partially defines a spring chamber that contains pressurized gas (e.g., air) and permits the gas spring assemblies to support a load.

As a result of the relative movement between the sprung and unsprung masses of a vehicle, gas spring assemblies are routinely displaced between extended and compressed conditions, which results in repeated bending and unbending of the flexible sleeve or bellows. Furthermore, known gas suspension systems typically provide the capability of adjusting the height and/or alignment (i.e., leveling) of a sprung mass (e.g., a body or chassis of a vehicle) relative to an unsprung mass thereof (e.g., a wheel-engaging member or axle housing of the vehicle). Such actions can result in additional bending and unbending of the flexible sleeve or bellows of the gas spring assemblies.

Elastomeric devices, such as flexible sleeves and bellows, for example, may, under some conditions, experience a decrease in performance and/or other characteristics as a result of such cyclical flexing (i.e., bending and unbending) as well as physical conditions of use (e.g., gas pressure level, internal spring temperature), exposure to certain environmental conditions and/or agents, or any combination of these and/or other factors. As such, it may be desirable, in some cases, to identify and/or assist in predicting the occurrence of such decreases in performance and/or other characteristics, whether presenting in a somewhat sudden manner over an abbreviated timeframe or in a more gradual manner over an extended duration.

Accordingly, it is believed desirable to develop indicators operative to determine and/or communicate an estimated remaining life of a spring device, as well as gas spring assemblies, control systems and/or suspension systems that include one or more of such indicators. It is also believed desirable to develop methods of determining an estimated remaining life of a spring device or component thereof.

BRIEF DESCRIPTION

One example of an indicator of an estimated remaining life of an associated spring device in accordance with the subject matter of the present disclosure can include at least one processor programmed to receive signals having a relation to at least one of a usage condition and an environmental exposure condition of an associated spring device, such as may occur from a first timing event to a second timing event. The at least one processor can also be programmed to derive data from the received signals. The at least one processor can be further programmed to determine an estimated remaining life of an associated spring device using the data and an expression modeling a relationship between an estimated remaining life of the associated spring device and at least one of a usage condition and an environmental exposure condition.

In some cases, an indicator can include at least one sensor operative to generate signals having a relation to at least one of the usage condition and environmental exposure condition of the associated spring device.

Another example of an indicator for predicting a remaining life of an associated spring device in accordance with the subject matter of the present disclosure is provided. The indicator can include at least one processor programmed to receive data and/or signals indicating wearing of the spring device from beginning-of-life of the gas spring to present time. A plurality of parameters can be extracted or derived from the received data and/or signals to parameter values, where the plurality of parameters indicate wearing of the gas spring. An estimated remaining life of the spring device can be determined from the parameter values using a model modeling a relationship between the plurality parameters and the estimate remaining life.

One example of a gas spring and indicator assembly in accordance with the subject matter of the present disclosure can include a gas spring and an indicator. The gas spring can include opposing end members and a flexible wall secured therebetween that at least partially defines a spring chamber. The indicator can be supported on one of the opposing end members. The indicator can include at least one sensor operative to generate a signal having a relation to at least one of the usage condition and an environmental exposure condition of the gas spring. The indicator can also include at least one processor communicatively coupled with the at least one sensor and programmed to receive signals from the at least one sensor and derived data from the received signals. The at least one processor can also be programmed to determine an estimated remaining life of at least the gas spring using the data and an expression modeling a relationship between an estimated remaining life of the gas spring and at least one of a usage condition and/or an environmental exposure condition.

One example of a suspension system in accordance with the subject matter of the present disclosure of an associated vehicle having an associated sprung mass and an associated sprung mass can include a gas spring and an indicator. The gas spring can be operatively disposed between the associated sprung mass and the associated unsprung mass. The indicator can include at least one sensor operative to generate a signal having a relation to at least one of a usage condition and an environmental exposure condition. The indicator can also include at least one processor communicatively coupled with the at least one sensor and programmed to receive signals from the at least one sensor. The at least one processor can also be programmed to derive data from the received signals, and determine an estimated remaining life of at least the gas spring using the data and an expression modeling a relationship between an estimated remaining life of the gas spring and at least one of a usage condition and/or an environmental exposure condition.

Another example of a suspension system for associated sprung and unsprung masses of a vehicle in accordance with the subject matter of the present disclosure is provided. The suspension system can include a gas spring secured between the associated sprung and unsprung masses. The suspension system can further include at least one processor programmed to receive data and/or signals indicating wearing of the spring device from beginning-of-life of the spring device to present time. A plurality of parameters can be extracted or derived from the received data and/or signals to parameter values, where the plurality of parameters indicate wearing of the spring device. The estimated remaining life of the spring device can be determined from the parameter values using a model modeling the relationship between the plurality parameters and the remaining life.

One example of a method of determining an estimated remaining life of a spring device in accordance with the subject matter of the present disclosure can include receiving by at least one processor signals having a relation to at least one of the usage condition and/or an environmental exposure condition, such as from a first timing event to a second timing event. The method can also include deriving data from the signals using the at least one processor. The method can further include determining using the at least one processor an estimated remaining life of the spring device using the data and an expression modeling a relationship between an estimated remaining life of the spring device and at least one of the usage condition and/or an environmental exposure condition.

Another example of a method for predicting remaining life of a spring device in accordance with the subject matter of the present disclosure is provided. The method can include receiving by at least one processor data and/or signals indicating wearing of the spring device from beginning-of-life of the spring device to present time. A plurality of parameters can be extracted by the at least one processor from the received data and/or signals to parameter values. The plurality of parameters can indicate wearing of the spring device. The remaining life of the spring device can be determined by the at least one processor from the parameter values using a model modeling the relationship between the plurality parameters and the remaining life.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
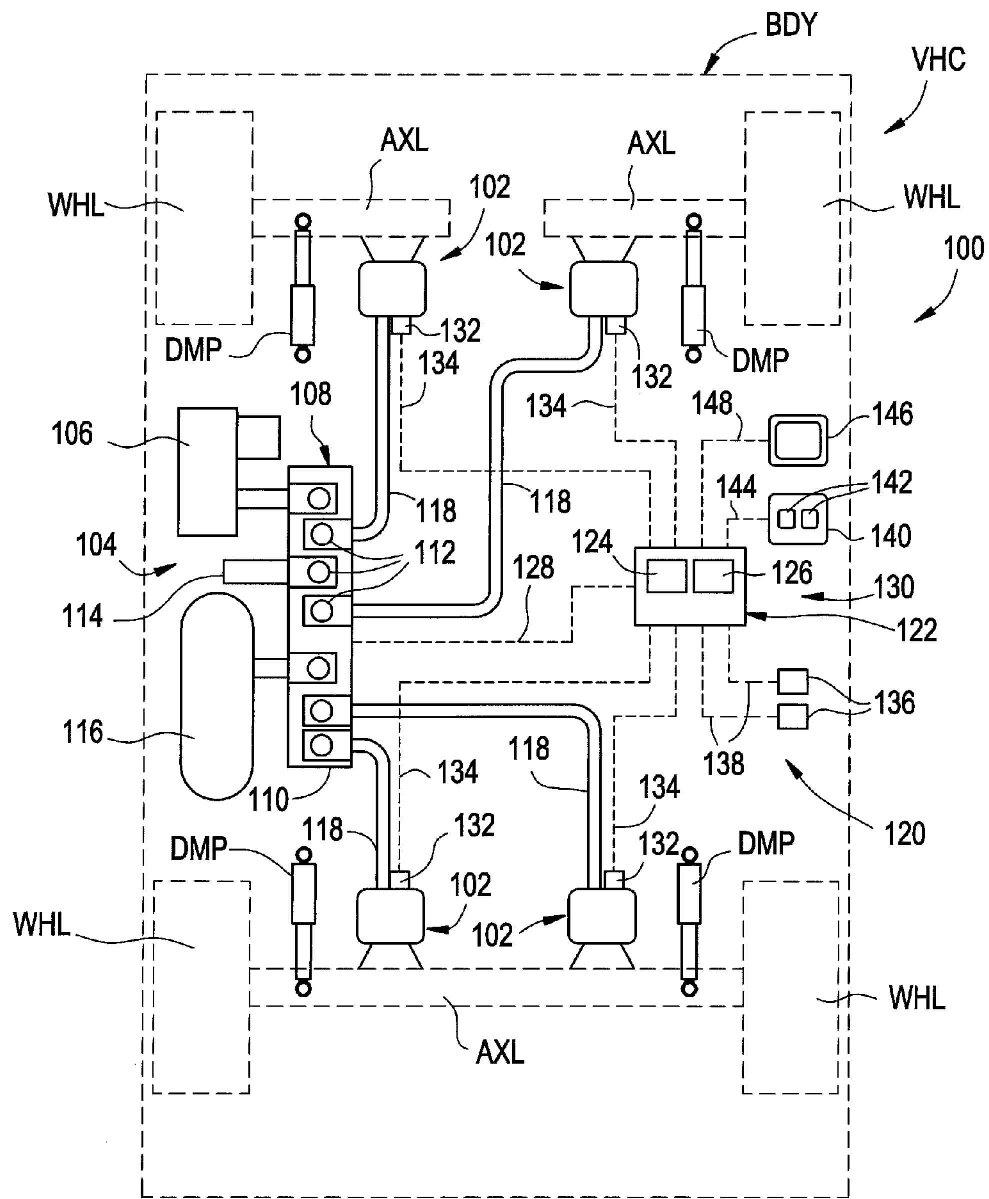
FIG. 1 is a schematic representation of one example of a suspension system of an associated vehicle that includes one or more indicators in accordance with the subject matter of the present disclosure.

FIG. 1 illustrates one example of a suspension system 100 disposed between a sprung mass, such as an associated vehicle body BDY, for example, and an unsprung mass, such as one or more associated wheels WHL or one or more associated axles AXL, for example, of an associated vehicle VHC. It will be appreciated that any one or more of the components of suspension system 100 can be operatively connected between the sprung and unsprung masses of associated vehicle VHC in any suitable manner. Additionally, suspension system 100 can, optionally, include a plurality of damping members, such as dampers DMP, for example, and that any such damping members can also be operatively connected between the sprung and unsprung masses of associated vehicle VHC in any suitable manner.

Suspension system 100 can also include a plurality of gas spring assemblies 102 supported between the sprung and unsprung masses of associated vehicle VHC. In the arrangement shown in FIG. 1, four gas spring assemblies are included, one of which is disposed toward each corner of associated vehicle VHC adjacent a corresponding one of associated wheels WHL. However, it will be appreciated that any other suitable number of gas spring assemblies could alternately be used in any other configuration or arrangement. As shown in FIG. 1, gas spring assemblies 102 are supported between associated axles AXL and associated vehicle body BDY of associated vehicle VHC. Additionally, it will be recognized that gas spring assemblies 102 are illustrated in FIG. 1 as being of a rolling lobe-type construction. It is to be understood, however, that gas spring assemblies 102 could be of any other type, kind and/or construction.

Suspension system 100 also includes a pressurized gas system 104 operatively associated with gas spring assemblies 102 for selectively supplying pressurized gas (e.g., air)

thereto and selectively transferring pressurized gas therefrom. In the exemplary embodiment shown in FIG. 1, pressurized gas system 104 includes a pressurized gas source, such as a compressor 106, for example, for generating pressurized air or other gases. A control device, such as a valve assembly 108, for example, is shown as being in communication with compressor 106 and can be of any suitable configuration or arrangement. In the exemplary embodiment shown, valve assembly 108 includes a valve block 110 with a plurality of valves 112 supported thereon. Valve assembly 108 can also optionally include a suitable exhaust, such as a muffler 114, for example, for venting pressurized gas. Optionally, pressurized gas system 104 can also include a reservoir 116 in fluid communication with compressor 106 and/or valve assembly 108 and suitable for storing pressurized gas.

Valve assembly 108 is in communication with gas spring assemblies 102 through suitable gas transfer lines 118. As such, pressurized gas can be selectively transferred into and/or out of gas spring assemblies 102 through valve assembly 108 by selectively operating valves 112, such as to alter or maintain vehicle height at one or more corners of associated vehicle VHC, for example.

Suspension system 100 is also shown as including a control system 120. It will be appreciated that control system 120 can communicate, in any suitable manner, with any one or more systems and/or components of associated vehicle VHC and/or suspension system 100, such as for selective operation, control and/or monitoring thereof. Further, control system 120 can include one or more controllers 122, which may alternatively be referred to herein as electronic control units or ECUs, to facilitate such communication, operation, control and/or monitoring. While only one controller is shown in FIG. 1, it will be appreciated that any suitable number of one or more controllers could be included.

Additionally, the one or more controllers and/or ECUs can be of any combination of any suitable types, kinds, configurations and/or constructions. In some cases, controllers 122 typically include one or more memories 124, containing processor executable instructions for performing the functionality associated with controllers and/or ECUs 122, and one or more processors 126 executing the processor executable instructions to perform the functionality. Controllers and/or ECUs 122 can communicate with compressor 106 and/or valve assembly 108 in any suitable manner, such as through a conductor or lead 128, for selective operation and control thereof, which can include supplying and exhausting pressurized gas to and/or from gas spring assemblies 102.

A suspension system in accordance with the subject matter of the present disclosure can include one or more indicators adapted to predict or otherwise determine an estimated remaining life of one or more spring devices (e.g., gas spring assemblies 102), or one or more components thereof. Additionally, or in the alternative, such one or more indicators can generate, output or otherwise communicate signals, data and/or other information (collectively referred to hereinafter as "signals") having a relation to an estimated remaining life of one or more spring devices (e.g., gas spring assemblies 102), or one or more components thereof.

In some cases, a single indicator could be included that is operative to determine an estimated remaining life of two or more spring devices (e.g., two or more of gas spring assemblies 102), and/or to generate, output or otherwise communicate one or more signals having a relation to an estimated remaining life of two or more spring devices (e.g., two or more of gas spring assemblies 102). In other cases, a plurality of indicators could be included with one indicator operatively associated with a single spring device (e.g., one of gas spring assemblies 102), or one or more components thereof.

In some cases, the one or more indicators can be operative to monitor and/or record cyclic flexing and/or other physical usage conditions of one or more spring devices and/or to monitor and/or record one or more environmental conditions to which the one or more spring devices may be exposed. Additionally, the one or more indicators can be operative to determine an estimated remaining life of the one or more spring devices associated therewith based, at least in part, on such cyclic flexing, physical usage and/or environmental exposure conditions.

As indicated above, the one or more spring devices can, in some cases, take the form of gas spring assemblies, such as one or more of gas spring assemblies 102, for example. In such cases, the estimated remaining life determined by the one or more indicators can correspond to an estimated remaining life of one or more gas spring assemblies and/or one or more of the components thereof, such as a flexible sleeve or bellows thereof, for example.

It will be appreciated that any number and/or combination of factors can be utilized in determining an estimated remaining life of the one or more spring devices. In some cases, such factors and/or parameters can include cumulative usage, normal operating parameters and/or extreme conditions of operation of the one or more spring devices and/or any one or more components thereof. Non-limiting examples of usage and operation factors that may be utilized by an indicator in accordance with the subject matter of the present disclosure can include cumulative travel, cumulative flexing cycles, nominal operating pressure, maximum operating pressure, nominal operating temperature and maximum operating temperature. Additionally, or in the alternative, factors that may be utilized by an indicator in determining an estimated remaining life of the one or more spring devices can include environmental conditions and/or exposure to environmental agents. Non-limiting examples of such environmental conditions and/or agents can include cumulative and/or threshold exposure to chemical conditions and/or agents (e.g., oxygen ($O_2$), ozone ($O_3$), volatile organic compounds, etc.) and/or physical conditions and/or agents (e.g., heat, such as may disadvantageously increase the rate of oxygen ($O_2$) degradation).

It will be appreciated that an indicator in accordance with the subject matter of the present disclosure can take any suitable form, configuration, arrangement and/or configuration of components. In some cases, an indicator can take the form of a combination of components and/or systems in communication with one another such that a determination of an estimated remaining life of one or more spring devices can be made. In some cases, the combination of components and/or systems may be located in spaced-apart relation to one another such that the combination of components and/or systems at least partially operate as an indicator system. In such cases, a single device or component may not be physically identifiable as an indicator.

In other cases, however, an indicator can take the form of a combination of components that are packaged together and physically identifiable as an indicator. In some cases, an indicator can include one or more sensors for outputting, generating or otherwise communicating one or more signals, data and/or communications (collectively referred to hereinafter as "signals") corresponding to one of more factors associated with one or more spring devices, such as has been described above. And, such an indicator can be operative to determine an estimated remaining life of one or more spring devices based, at least in part, on the signals from the one or more sensors. In some cases, additional signals from other devices and/or systems can be communicated to the indicator, and could be used by an indicator in making an estimated remaining life determination.

One example of an indicator that is formed from a plurality of remotely-located components and/or systems is illustrated in FIG. 1 and is represented by arrow 130. In such case, the control system can, optionally, include one or more sensors that are disposed adjacent and/or are otherwise operatively associated with one of the spring devices. For example, control system 120 is shown as including a plurality of sensors 132 with one sensor disposed in operative association with one of gas spring assemblies 102. As such, sensors 132 can be suitable for monitoring and/or communicating localized conditions of use and/or exposure corresponding to the associated gas spring assembly. The one or more sensors can be communicatively coupled with the controller in any suitable manner. As one example, controller 122 is shown as being communicatively coupled with sensors 132 through conductors or leads 134. It will be appreciated, however, that any other suitable communication arrangement could alternately be used.

Additionally, or in the alternative, the control system can include one or more sensors operative to monitor, record or otherwise determine conditions that may be generally uniform, non-localized or otherwise determinable on a vehicle-wide or system-wide basis. It will be appreciated that such one or more sensors can be positioned in any suitable location, such as centrally located or positioned adjacent one or more of the spring devices. As one example, control system 120 is shown in FIG. 1 as including sensors 136 that are disposed in spaced-apart relation to gas spring devices 102. The one or more sensors can be communicatively coupled with the controller in any suitable manner. As one example, controller 122 is shown as being communicatively coupled with sensors 136 through conductors or leads 138. It will be appreciated, however, that any other suitable communication arrangement could alternately be used.

Figure 5:
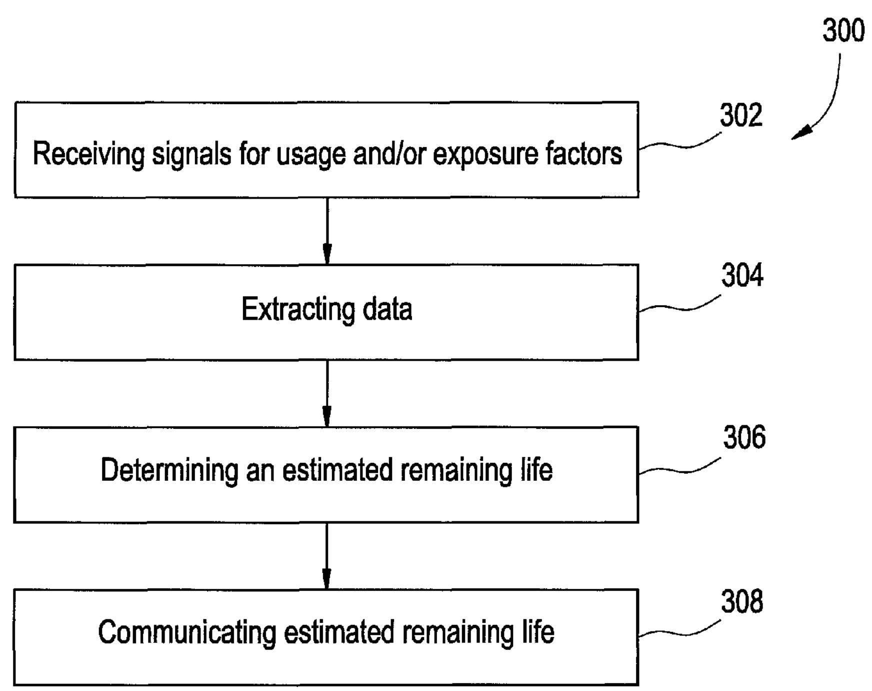
FIG. 5 is a graphical representation of one example of a method of determining an estimated remaining life of a spring device in accordance with the subject matter of the present disclosure.

In some cases, sensors 132 and/or 136 can generate, output or otherwise communicate signals having a relation to one or more factors that may be used for estimating or otherwise predicting a remaining life expectancy of one or more of gas spring assemblies 102. In some cases, estimating or otherwise predicting a remaining life expectancy can include monitoring, analyzing and/or otherwise determining conditions of usage, wear and exposure a flexible wall of a gas spring assembly, such as one or more of gas spring assemblies 102, for example. In some cases, estimating, determining and/or otherwise predicting an remaining life expectancy of a spring device can be include one or more of the actions described in connection with a method 300, such as is illustrated in FIG. 5 and discussed in detail hereafter. It will be appreciated, however, that such a method is merely exemplary and that other methods and/or combinations of actions could alternately be used.

Sensors 130 and/or 136 can generate, output or otherwise communicate signals that may indicate or otherwise have a relation to exposure of a flexible wall of a gas spring assembly to one or more environmental conditions and/or to usage and/or wear conditions of a flexible wall of a gas spring assembly. In some cases, usage and/or wear conditions of the flexible wall can relate to or otherwise include cycles of flexing of the flexible wall and/or pressure levels of in the gas within the spring chamber of a gas spring assembly. In some cases, environmental conditions and/or agents can include chemical conditions and/or agents, such as, for example, oxygen ($O_2$), ozone ($O_3$) and/or volatile organic compounds. In some cases, physical conditions and/or agents can, for example, include heat or temperature level, which may disadvantageously increase the rate of oxygen ($O_2$) degradation of the flexible wall.

Non-limiting examples of sensors suitable for generating, outputting or otherwise communicating signals relating to flexing and/or pressure can include height or distance sensors (e.g., electromechanical sensors, such as linear position transducers and mechanically-linked rotary potentiometers, ultrasonic wave sensors, and electromagnetic wave sensors, such as RF and laser sensors) and pressure sensors. Non-limiting examples of sensors suitable for generating, outputting and/or otherwise communicating signals indicating environmental conditions and/or agents can include ozone sensors and temperature sensors.

In some cases, an indicator in accordance with the subject matter of the present disclosure, such as indicator 130, for example, can be operative to determine an estimated remaining life of a spring device in response to a trigging event or condition. Non-limiting examples of trigger events can include periodic timer events and/or user input events. However, other types of trigger events are contemplated.

It will be appreciated that an indicator in accordance with the subject matter of the present disclosure can include any suitable systems and/or components for operation in association with triggering events. As one example, controllers or ECUs 122 can predict an estimated remaining life of one or more of gas spring assemblies 102 in response to a trigger event, such as a periodic timer event that occurs at preprogrammed or otherwise predetermined intervals (e.g., once every millisecond, once every second, once every 5 minutes, once every day, etc.).

A user input event is an event triggered by an associated user or operator, such as a driver of associated vehicle VHC, for example. It will be appreciated that such a user initiated event could be generated in any suitable manner, such as by way of an associated user input device 140 having one or more input buttons 142, for example. It will be appreciated that such a user input device can be in communication with controller 122 in any suitable manner, such as through a conductor or lead 144, for example. If provided, user input device 140 can be suitably positioned for easy access by the associated user or operator, such as in the cab or trunk of associated vehicle body BDY, for example.

Furthermore, an indicator in accordance with the subject matter of the present disclosure can generate, output or otherwise communicate a determination of an estimated remaining life of one or more spring devices (e.g., gas spring assemblies 102) in any suitable manner. As one example, controllers or ECUs 122 can generate, output or otherwise communicate an indication of the estimated remaining life of the one or more spring devices (gas spring assemblies 102) by way of a user output device 146. It will be appreciated that such a user output device can be in communication with controller 122 in any suitable manner, such as through a conductor or lead 148, for example. If provided, user output device 146 can be suitably positioned for easy access by the associated user or operator, such as in the cab or trunk of associated vehicle body BDY, for example.

An indicator in accordance with the subject matter of the present disclosure can generate, output or otherwise communicate the determination of an estimated remaining life in any suitable manner. In some cases, the indicator can indicate, for example, which spring devices are have reached an estimated end-of-life condition and/or which spring devices include less than a predetermined amount of an estimated remaining life. Additionally, or alternatively, the indication can, for example, indicate the remaining life of one or more of the spring devices (e.g., one or more of gas spring assemblies 102).

Figure 2:
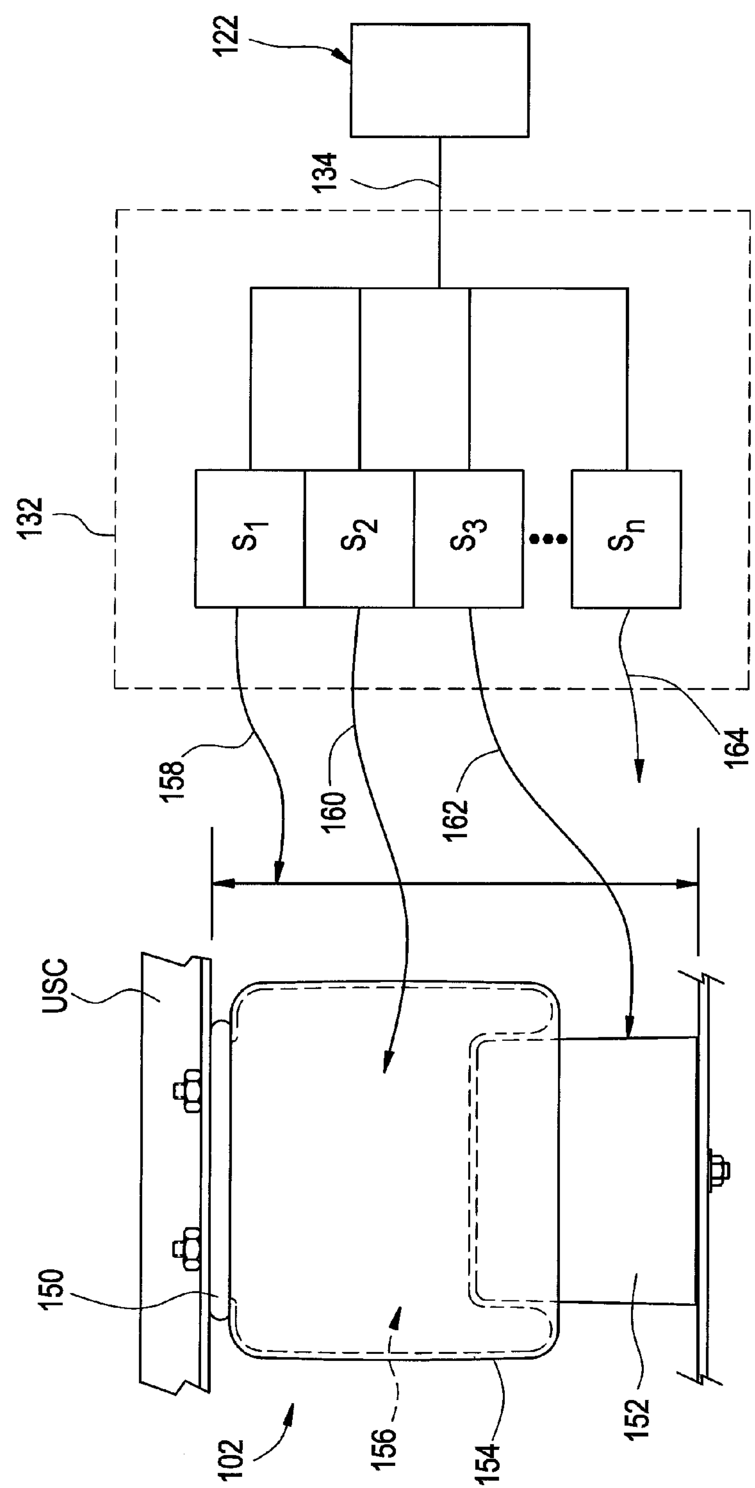
FIG. 2 is a schematic representation of one example of an indicator in accordance with the subject matter of the present disclosure disposed in operative association with a gas spring assembly.

With reference to FIGS. 1 and 2, gas spring assemblies 102 are shown as including one or more end members, such as, for example, an end member 150 and an end member 152 that is spaced apart from end member 150. End member 150 is shown in abutting engagement with a first or upper structural component USC, such as may be representative of vehicle body BDY in FIG. 1, for example. End member 152 is shown in abutting engagement with a second or lower structural component LSC, such as may be representative of one of axles AXL in FIG. 1, for example. End members 150 and 152 can be secured on or along structures of associated vehicle VHC in any suitable manner. Gas spring assemblies 102 are also shown in FIGS. 1 and 2 as including a flexible wall 154, such as an elastomeric sleeve or bellows, for example. Flexible wall 154 is secured between the end members and at least partially defines a spring chamber 156 containing a quantity of pressurized gas.

As indicated above, one or more sensors can be operatively associated with a spring device. In some cases, a single sensor can be used, such as may be suitable for generating, outputting or otherwise communicating signals corresponding to a particular factor, condition or property. In other cases, a plurality of sensors could be operatively associated with the spring device, such as may be suitable for generating, outputting or otherwise communicating signals corresponding to two or more factors, conditions and/or properties.

As one example, sensor 132 can include a single sensor, such as a height or distance sensor, a pressure sensor, an acceleration sensor or a temperature sensor. In other cases, sensor 132 in FIG. 1 can be representative of a plurality of sensors that are disposed in proximal relation to one another, such as are represented in FIG. 2 by sensors $S_1$ to $S_n$ as being disposed in operative association with gas spring assembly 102, for example. In some cases, two or more of the plurality of sensors can be mounted together with one another, such as in a common housing (not shown), for example. In other cases, the plurality of sensors could be mounted independently of one another in operative association with a gas spring assembly.

It will be appreciated that sensor 132 and/or sensors $S_1$ to $S_n$ can be of any suitable type, kind and/or configuration, and can be mounted or otherwise secured on or near a gas spring assembly in any suitable manner, such as on or along a component of the gas spring assembly or on or along an associated vehicle structure adjacent the gas spring assembly. Further, the one or more sensors can include any suitable number of sensors, such as a quantity within a range of from 1 to 20 sensors, for example. Additionally, it is to be appreciated that the number of sensors and/or the one or more types, kinds and/or configurations of the sensors can vary from one gas spring assembly of gas spring assemblies 102 to another gas spring assembly of gas spring assemblies 102. For example, one gas spring assembly of gas spring assemblies 102 can include two sensors, whereas another gas spring assembly of gas spring assemblies 102 can include zero sensors, one sensor or three sensors.

As discussed above, sensors $S_1$ to $S_n$ of sensor 130 can generate, output or otherwise communicate signals that may indicate or otherwise have a relation to localized conditions of use and/or exposure, such as may correspond to or otherwise be associated with one or more gas spring assemblies. Additionally, as discussed above, sensors $S_1$ to $S_n$ can be communicatively coupled with a controller or ECU or a different sensor in any suitable manner. As one example, sensors $S_1$ to $S_n$ are shown in FIG. 2 as being communicatively coupled with controller 122 by way of conductors or leads 134. It will be appreciated, however, that other configurations and/or arrangements could alternately be used. Non-limiting examples of suitable sensors can include height or distance sensors, pressure sensors, acceleration sensors and/or temperature sensors.

Additionally, it will be appreciated that the one or more sensors (e.g., sensor 130 and/or sensors $S_1$ to $S_n$) can be operatively associated with a gas spring assembly and/or the localized conditions of use and/or exposure in any suitable manner. As one example, sensor $S_1$ is shown as being in operative association with a height or distance between end members 150 and 152, as is represented by arrow 158. For example, sensor $S_1$ could take the form of a height sensor adapted to broadcast an ultrasonic or electromagnetic wave (e.g., radiofrequency or laser) and generate a signal having a relation to a distance between end members 150 and 152. As another example, sensor $S_2$ is shown as being in operative association with spring chamber 156, as is represented by arrow 160. Sensor $S_2$ could, for example, be a pressure sensor operative to output a signal indicative of the gas pressure within spring chamber 156. As a further example, sensor $S_3$ is shown as being operatively associated with second end member 152, as is represented by arrow 162. In some cases, sensor $S_3$ could be an accelerometer operative to output a signal indicative of accelerations acting on end member 152, such as may be due to inputs acting on an unsprung mass of a vehicle, for example. As another example, sensor $S_n$ is indicated as being in operative association gas spring assembly 102, such as a localized area surrounding the gas spring assembly, as is represented by arrow 164. Sensor $S_n$ could, for example, be a temperature sensor operative to output a signal indicative of the ambient temperature in the area surrounding, adjacent or otherwise near gas spring assembly 102.

As described above, an indicator in accordance with the subject matter of the present disclosure can be formed from a plurality of remotely-located components and/or systems, such as indicator 130 in FIG. 1, for example. Additionally, or in the alternative, an indicator in accordance with the subject matter of the present disclosure can be formed from a combination of components that are packaged together in a physically identifiable form. In such case, the indicator can include one or more sensors for outputting, generating or otherwise communicating one or more signals corresponding to one of more factors associated with one or more spring devices and can be operative to determine an estimated remaining life of one or more spring devices based, at least in part, on the signals from the one or more sensors. In some cases, the indicator can also include one or more memories containing processor executable instructions for performing desired functionality and/or one or more processors suitable for executing the processor executable instructions to perform the desired functionality.

Figure 3:
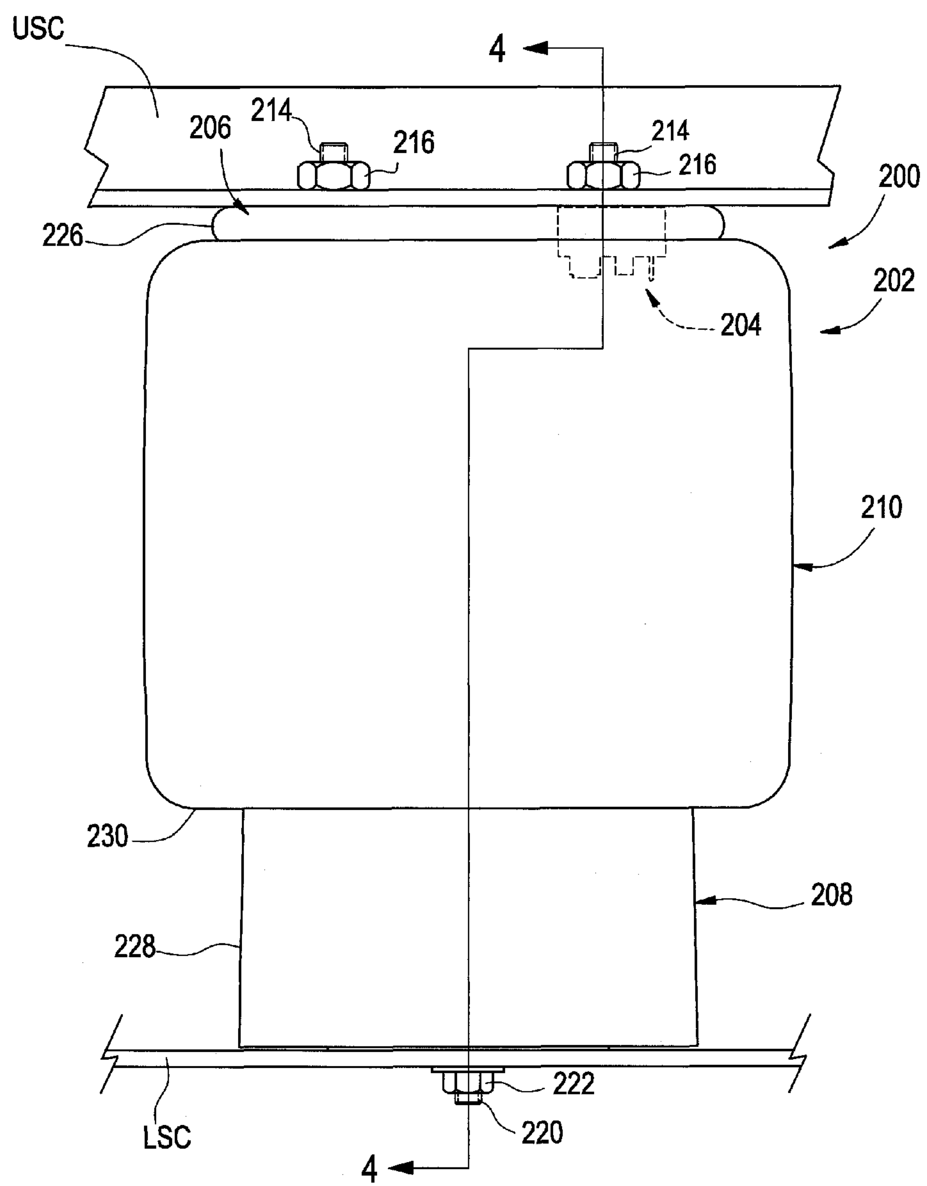
FIG. 3 is a side view of one example of a gas spring and indicator assembly in accordance with the present disclosure.
Figure 4:
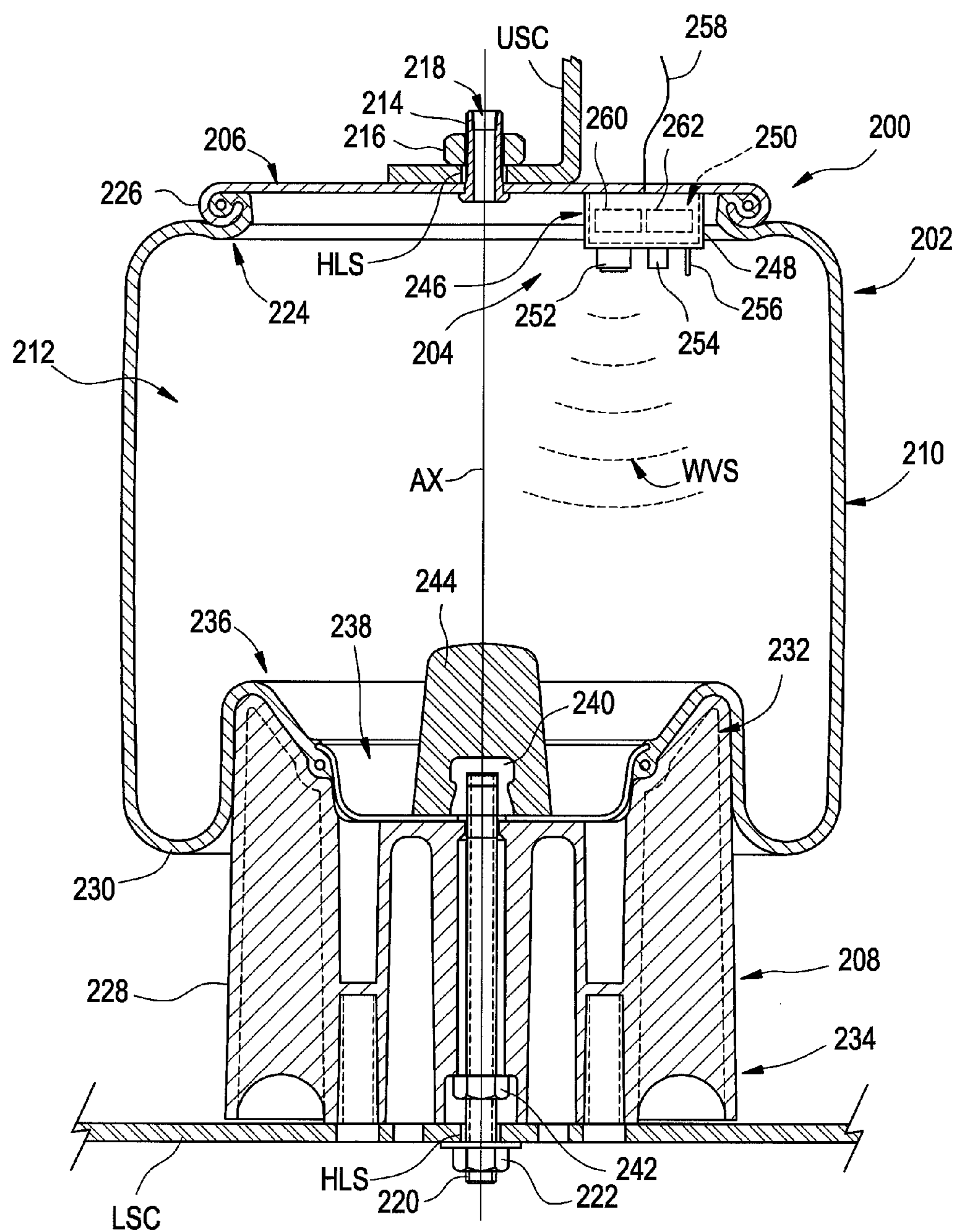
FIG. 4 is a cross-sectional side view of the gas spring and indicator assembly in FIG. 3 taken from along line 4-4 therein.

One example of such a construction is shown in FIGS. 3 and 4 in the form of a gas spring and indicator assembly 200 that includes a gas spring 202 and an indicator 204 that is assembled together with gas spring 202. In some cases, gas spring and indicator assembly may be suitable for use as an alternative to gas spring assemblies 102 and sensors 132 of suspension system 100 FIG. 1. In some such cases, however, indicator 130 may still be provided.

Gas spring and indicator assembly 200 is shown in FIGS. 3 and 4 as having a longitudinally-extending axis AX (FIG. 4) and can include one or more end members, such as an end member 206 and an end member 208 that is spaced longitudinally from end member 206. A flexible wall 210 can extend peripherally around axis AX and can be secured between the end members in a substantially fluid-tight manner such that a spring chamber 212 (FIG. 4) is at least partially defined therebetween.

Gas spring and indicator assembly 200 can be disposed between associated sprung and unsprung masses of an associated vehicle in any suitable manner. For example, one end member can be operatively connected to the associated sprung mass with the other end member disposed toward and operatively connected to the associated unsprung mass. In the embodiment shown in FIGS. 3 and 4, for example, end member 206 is secured along a first or upper structural component USC, such as associated vehicle body BDY in FIG. 1, for example, and can be secured thereon in any suitable manner. For example, one or more securement devices, such as mounting studs 214, for example, can be included along end member 206. In some cases, the one or more securement devices (e.g., mounting studs 214) can project outwardly from end member 206 and can be secured thereon in a suitable manner, such as, for example, by way of a flowed-material joint (not shown) or a press-fit connection (not identified). Additionally, such one or more securement devices can extend through mounting holes HLS (FIG. 4) in upper structural component USC and receive one or more threaded nuts 216 or other securement devices, for example. As an alternative to one or more of mounting studs 214, one or more threaded passages (e.g., blind passages and/or through passages) could be used in conjunction with a corresponding number of one or more threaded fasteners.

Additionally, a fluid communication port, such as a transfer passage 218 (FIG. 4), for example, can optionally be provided to permit fluid communication with spring chamber 212, such as may be used for transferring pressurized gas into and/or out of the spring chamber, for example. In the exemplary embodiment shown, transfer passage 218 extends through at least one of mounting studs 214 and is in fluid communication with spring chamber 212. It will be appreciated, however, that any other suitable fluid communication arrangement could alternately be used.

End member 208 can be secured along a second or lower structural component LSC, such as one of associated axles AXL in FIG. 1, for example, in any suitable manner. As one example, lower structural component LSC could include one or more mounting holes HLS extending therethrough. In such case, a mounting stud 220 could be operatively connected to end member 208 and could extend through one of mounting holes HLS to receive a corresponding threaded nut 222, for example.

It will be appreciated that the one or more end members can be of any suitable type, kind, construction and/or configuration, and can be operatively connected or otherwise secured to the flexible wall in any suitable manner. In the exemplary arrangement shown in FIGS. 3 and 4, for example, end member 206 is of a type commonly referred to as a bead plate that is secured to a first end 224 of flexible wall 210 using a crimped-edge connection 226. End member 208 is shown in the exemplary arrangement in FIGS. 3 and 4 as being of a type commonly referred to as a piston (or a roll-off piston) that has an outer side surface 228 that abuttingly engages flexible wall 210 such that a rolling lobe 230 is formed therealong. As gas spring 202 is displaced between extended and collapsed conditions, rolling lobe 230 is displaced along outer side surface 228 in a conventional manner.

As identified in FIG. 4, end member 208 extends generally between a first or upper end 232 and a second or lower end 234. One example of a connection between the flexible wall and the end member is shown as including a second end 236 of flexible wall 210 being secured on or along upper end 232 of end member 208 using an end closure 238. The end closure can be secured on or along end member 208 in any suitable manner. In the exemplary embodiment shown, a retaining nut 240 is threadably secured on mounting stud 220 and engages end closure 238. By securing mounting stud 220 on end member 208, such as by using a threaded nut 242, for example, the end closure can be drawn tight to upper end 232 to thereby secure second end 236 of the flexible wall therebetween. It is to be understood, however, that the arrangement shown and described is merely exemplary and that any other suitable construction and/or configuration can alternately be used.

A jounce bumper 244 can, optionally, be supported within spring chamber 212, such as to inhibit direct contact between end members 206 and 208, for example. It will be appreciated that the jounce bumper, if included, can be supported on or along an end member in any suitable manner. For example, jounce bumper 244 is shown as being received on and retained by retaining nut 240. It will be appreciated, however, that other arrangements could alternately be used.

Indicator 204 is shown in FIG. 4 as being disposed within spring chamber 212 of gas spring 202 and can be secured on or along one or more of the components of the gas spring in any suitable manner. As one example, indicator 204 is shown as being disposed along end member 206 and can be secured thereto in any suitable manner. As one example, indicator 204 can include a housing 246 and one or more sensors that are supported on, in or otherwise along the housing. Housing 246 can include one or more housing walls 248 that can be secured on or along the end member in any suitable manner, such as by way of one or more threaded fasteners (not shown) or a flowed-material joint (not shown), for example. Additionally, the one or more housing walls of housing 246 can at least partially define a housing chamber 250, which may be dimensioned to at least partially receive one or more other components of indicator 204.

Indicator 204 is also shown as including a plurality of sensors 252, 254 and 256. In some cases, one or more of the plurality of sensors can be supported on or along one of the housing walls of housing 246, such as is shown in FIG. 4, for example. It will be appreciated that the sensors can be of any suitable type, kind and/or construction, such as has been described above. In the arrangement shown in FIG. 4, sensor 252 is a height or distance sensor, such as an ultrasonic sensor that transmits and receives ultrasonic waves WVS, for example. Additionally, sensor 254 is shown as being representative of a pressure sensor or pressure transducer, and sensor 256 is shown as being representative of a temperature sensor or thermocouple. It will be appreciated, however, that sensors of other types and/or kinds could additionally or alternately be used.

In some cases, the one or more sensors of indicator 204 can be communicatively coupled with another system and/or component in a suitable manner, such as by way of a lead or conductor 258, which, in some cases, could correspond to lead 134 in FIG. 1. Indicator 204 can also, optionally, include one or more memories 260, such as may be suitable for containing processor executable instructions for performing the functionality associated with indicator 204. Additionally, or in the alternative, indicator 204 can, optionally, include one or more processors 262, such as may be suitable for executing the processor executable instructions to perform such functionality.

One example of a method 300 of predicting and/or otherwise determining an estimated remaining life of a spring device, such as one of gas spring assemblies 102 and/or 202, for example, or a component thereof, in accordance with the subject matter of the present disclosure is graphically represented in FIG. 5. It will be appreciated that a method in accordance with the subject matter of the present disclosure, such as method 300, for example, can be performed, executed or otherwise completed in any suitable manner and through the use of any suitable systems and/or components. As one example, a method of predicting and/or determining an estimated remaining life of a spring device could be performed by indicator 130 through the use of controllers or ECUs 122 in FIG. 1, which could be operative to perform method 300 to predict or determine an estimated remaining life of one or more of gas spring assemblies 102, for example. In such case, one or more of memories 124 and/or processors 126 of controllers or ECUs 122 together with one or more of sensors 132 and/or 136 can be used to perform method 300. Additionally, or in the alternative, a method of predicting and/or determining an estimated remaining life of a spring device could be performed by indicator 204, which could be operative to perform method 300 to determine an estimated remaining life of one or more of gas springs 202, for example. In such case, one or more of memories 260 and/or processors 262 together with one or more of sensors 136, 252, 254 and/or 256 can be used to perform method 300. It will be appreciated that, in still other cases, a combination of features and components of indicators 130 and 204, in whole or in part, could be used to perform a method in accordance with the subject matter of the present disclosure.

Method 300 can include receiving signals having a relation to the conditions of use and/or environmental exposure of a spring device or component thereof, such as is represented in FIG. 5 by item number 302. Method 300 can also include extracting or deriving data from the signals received in item 302, as is represented by item number 304. Method 300 can further include determining an estimated remaining life of a spring device using at least a portion of the data derived in item 304 together with an expression or algorithm modeling a relationship between estimated remaining life of a spring device and at least one of the conditions of use and/or environmental exposure of the spring device, as is represented in FIG. 5 by item number 306. Method 300 can also, optionally, include communicating signals, data and/or information having a relation to the estimated remaining life determined in item 306 to a device, system or user, such as is represented in by item number 308.

With reference to item 302, the signals can be received from one or more sensors, such as one or more of sensors 132, 136, 252, 254 and/or 256, for example. In some cases, the signals can be monitored and/or recorded over a period spanning from a first timing event (e.g., a beginning-of-life condition of the spring device) to a second timing event (e.g., approximately the present time). In some cases, the signals can be monitored and/or recorded on a substantially continuous basis, such as at predetermined intervals or frequencies. It will be appreciated that any suitable intervals and/or frequencies could be used. Non-limiting examples of such intervals and/or frequencies include frequencies of once per week, once per day, once per hour, once every 10 minutes, once every minute, and/or at frequencies within a range of from approximately 1 Hz to approximately 50 kHz, for example. In other cases, the signals may be monitored and/or recorded under predetermined conditions of use and/or exposure, such as upon the signals exceeding a predetermined value, for example. It will be appreciated that any combination of monitoring and recording actions can be used, and that such actions may vary from sensor to sensor and/or from condition to condition.

With reference to item 304 of method 300, data can be extracted or otherwise derived from one or more signals in any suitable manner. As one example, data can be derived the one or more signals by generating a plurality of data samples spanning from a first timing event (e.g., a beginning-of-life of the spring device) to a second timing event (e.g., the end of the most recent usage period the spring device) for one or more preselected factors. In some cases, data samples can include values derived over a sample period that correspond to one or more factors of the conditions of use and/or environmental exposure conditions, such as may relate to a flexible wall of a gas spring assembly, for example. Other than for the first data sample, a sample period can, in some cases, span from the time of generating an immediately preceding data sample (e.g., a first timing event) to the time of generating the current data sample (e.g., a second timing event). For the first data sample, the sample period can, in some cases, span from a beginning-of-life event of the spring device to the time of generating the first data sample. In some cases, terms such as "parameters," "sample parameters," and the like may be used herein and can refer to one or more conditions or factors of use and/or one or more environmental exposure conditions or factors. Non-limiting examples of such sample parameters can include one or more of distance traveled by a spring device, a number of cycles of a spring device, a jounce pressure of gas within a spring chamber of a gas spring assembly, and a temperature of or around a spring device. Other sample parameters are also contemplated, such as an ozone level experienced by the spring device, for example.

In some cases, a data sample for a distance traveled parameter of a spring device can be the sum of the compression and/or expansion distances for all periods of compression and/or expansion during a sample period. In some cases, a compression or expansion distance for a period of compression or expansion can be the difference in height of the spring device at the beginning of the period and at the end of the period. As such, the distance traveled can be determined by directly or indirectly analyzing variations in the height of the spring device over the lifetime thereof or another sample period.

Variations in the height of the spring device can be directly or indirectly sensed in any suitable manner, such as, for example, by analyzing received signals from one or more of height sensors, distance sensors and/or pressure sensors. It will be appreciated, however, that other sensors can additionally, or in the alternative, be utilized. For example, in some cases, a height sensor can measure the height of the spring device. In other cases, a distance sensor can measure the distance between two structural components (e.g., the sprung mass and the unsprung mass), which can be correlated to a height of the spring device. In still other cases, a pressure sensor can be used to measure the gas pressure within the spring chamber of a gas spring assembly. In some cases, the spring pressure can be correlated to a height of the gas spring assembly, since gas pressure tends to increase and decrease as the height of the gas spring assembly decreases and increases, respectively.

A data sample for a number of cycles of a spring device can be the number of cycles of the spring device during a sample period, such as a duration between a first timing event and a second timing event, for example. In some cases, a cycle of a spring device can be a period of compression of the spring device, immediately followed by a period of expansion of the spring device, or vice versa. As such, the number of cycles of a data sample can be determined by counting the number of cycles during a sample period. In some cases, cycles of a spring device having a distance traveled that is less than a predetermined threshold, such as a threshold within a range of from approximately 0.05 inches to approximately 0.50 inches, for example, may be filtered out to decrease the likelihood of underestimating the remaining life of a spring device. In some cases, the distance traveled of a cycle of the spring device can be the sum of the distance the spring device compresses and the distance the spring device expands during a sample period. It will be appreciated that the distance traveled can be determined in any suitable manner, such as has been discussed above, for example.

In some cases, the number of cycles of a gas spring assembly for a data sample can be determined by analyzing received signals for one or more distance sensors, height sensors and/or pressure sensors. It will be appreciated, however, that other sensors and/or deriving techniques can additionally, or in the alternative, be used. For example, during periods of compression of a gas spring assembly, the gas pressure in the spring chamber generally increases. And, during periods of expansion, the gas pressure in the spring chamber of a gas spring assembly generally decreases. As such, the number of cycles of a gas spring assembly could be determined by analyzing variations in gas pressure within the spring chamber of a gas spring assembly during a sample period.

Further, during periods of compression of a gas spring assembly, the height of the gas spring assembly will generally decrease. And, during periods of expansion of the gas spring assembly, the height of the gas spring assembly will generally increase. As such, a number of cycles of a gas spring assembly can be determined by directly or indirectly analyzing variations in the height of the gas spring assembly over the lifetime thereof. Variations in height can be directly or indirectly sensed using the height sensor or the distance sensor. For example, the height sensor can be employed to measure the height of the gas spring assembly. As another example, the distance sensor can be used to measure the distance between the sprung and unsprung masses, which can be correlated to the height of the gas spring assembly.

The term jounce pressure and the like generally refer to the gas pressure within the spring chamber of a gas spring assembly during compression of the gas spring assembly. A data sample for a jounce pressure of a spring chamber of a gas spring assembly can be the gas pressure the gas spring assembly underwent during a sample period, such as a duration between a first timing event and a second timing event, for example. The jounce pressure of a data sample can, for example, be: one of the maximum, the minimum and the average jounce pressure of the gas spring assembly during the sample period; one of the maximum, the minimum and the average jounce pressure at a specific cycle within the sample period, such as the last cycle of the sample period; one of the maximum, the minimum, and the average peak jounce pressure of the gas spring assembly during the sample period; and/or the peak jounce pressure at a specific cycle within the sample period, such as the last cycle of the sample period. As used herein, the term peak jounce pressure refers to a jounce pressure at maximum compression of a cycle. Jounce pressure and/or peak jounce pressure can be determined by analyzing received signals, for example, from a pressure sensor and by analyzing cycles of the gas spring assembly. It will be appreciated that cycles can be determined in any suitable manner, such as by being detected as has been described above, for example.

A data sample for a temperature of a gas spring assembly can be a temperature to which the gas spring assembly was exposed to during a sample period, such as a duration between a first timing event and a second timing event, for example. A temperature can, for example, be a temperature of a gas spring assembly at a specific point within the sample period, such as at the time of generating the data sample; or one of the maximum, the minimum and the average temperature of a gas spring assembly during the sample period. Temperature of the gas spring assembly can be determined by analyzing received signals, for example, from a temperature sensor.

The data samples can include data samples generated at a predetermined interval, rate or frequency, such as has been described above. Additionally or alternatively, data samples can include values generated based on sample parameters and/or deviations in sample parameter values. For example, a data sample can be generated every predetermined number of cycles, such as every 100 cycles. As another example, a data sample can be generated every time jounce pressure deviates a predetermined amount from the jounce pressure of the last data sample. To ensure noise does not affect the generation of data samples, the duration of deviations can be required to exceed a predetermined amount of time, such as a predetermined amount of time within a range of from approximately 0.01 seconds to approximately 5 seconds, for example.

As is to be appreciated, the data samples are generated over a period of time. Further, the generation of the data samples includes monitoring and analyzing the received data and/or signals from the sensors. Moreover, because the data samples are generated over a period of time, the data samples are typically stored in a memory, such as memories 124 of controllers 122 in FIG. 1 and/or memory 260 of indicator 204 in FIG. 4, for subsequent processing, discussed hereafter.

With reference to item number 306 of method 300, an estimated remaining life of a spring device can be determined using the generated data samples. In some cases, such an action can include inputting values and/or data samples into an expression or algorithm modeling a relationship between the values and/or sample parameters and the estimated remaining life of a spring device. In some cases, a model can be generated experimentally through exposure of a copy of a spring device to varying usage patterns and conditions, and/or various environmental exposure conditions and/or agents. For example, through experimentation it was found that an estimated remaining life of a gas spring assembly can be logarithmically related to jounce pressure.

One example of an expression or model for predicting or determining an estimated remaining life of a gas spring assembly is as follows:

$$\%\ \text{Remaining Life} = \left\{1 - \left(\frac{\sum_{i=1}^{n} D_i}{D_{Life}} + \frac{\sum_{i=1}^{n} 2^{\left(\frac{\Delta T_i}{10}\right)}}{t_{Life}}\right)\right\}100\%.$$

The expression takes n data samples spanning from a first timing event (e.g., a beginning-of-life event) to a second timing event (e.g., the present time). Each data sample, identified by index i, includes distance traveled D and temperature T. $\Delta T_i=0$ where $T_i-T_{Ref}<0$ and $\Delta T_i=T_i-T_{Ref}$ otherwise. $D_{Life}$ and $T_{Ref}$ are predetermined values which are determined during experimental testing with a copy of the spring device. $D_{Life}$ is the distance traveled by the spring device until the end-of-life during lab fatigue testing. $D_{Life}$ can be determined, as described above, or can be estimated. For example, if a spring device normally meets a minimum of 1 million cycles at room temperature with a stroke of ±3", $D_{Life}$ can be $1\times10^6*6"=6\times10^6"$. $T_{Ref}$ is the temperature of the copy of the spring device during the lab fatigue testing, such as 23° C.

$T_{Ref}$ is typically the average temperature of the spring device during the lab fatigue testing. Further, $t_{Life}$ is a predetermined value, such as 5 years, and an estimate of the total amount of life (i.e., the difference between beginning-of-life and end-of-life) in the field ignoring fatigue life.

Another example of an expression or model for predicting or determining an estimated remaining life of a spring device is as follows:

$$\%\ \text{Remaining Life} = \left\{1 - \left(\frac{\sum_{i=1}^{n} N_i}{N_{Life}} + \frac{\sum_{i=1}^{n} 2^{\left(\frac{\Delta T_i}{10}\right)}}{t_{Life}}\right)\right\} * 100\%.$$

As above, the expression takes n data samples spanning from a first timing event (e.g., beginning-of-life) to a second timing event (e.g., the present time). However, in contrast to the above model, each data sample, identified by index i, includes number of cycles N and temperature T. $N_{Life}$ is a predetermined value which is determined during experimental testing with a copy of the spring device. $N_{Life}$ is the total amount of cycles until end-of-life during lab fatigue testing. The remaining parameters (e.g., $t_{Life}$) are the same as described above.

A further example of an expression or model for predicting or determining an estimated remaining life of a gas spring assembly is as follows:

$$\%\ \text{Remaining Life} = \left\{1 - \sum_{i=1}^{n}\left(\frac{N_i}{(-\alpha \ln þ_i + \beta)_{T_{ref}}} * 2^{\frac{\Delta T_i}{10}}\right)\right\} * 100\%$$

As above, the model takes n data samples spanning from a first timing event (e.g., beginning-of-life) to a second timing event (e.g., the present time). However, in contrast to the above models, each data sample, identified by index i, includes number of cycles N, jounce pressure þ, and temperature T. α and β are predetermined values that connect gas spring life to jounce pressure and are determined during experimental testing with copies of the gas spring assembly. The remaining parameters (e.g., $\Delta T_i$) are the same as described above.

To determine α and β, nonlinear regression can be employed. Namely, for each of n>1 copies of the gas spring assembly, identified by index i, the number of cycles $N_i$ of the copy of the gas spring assembly from beginning-of-life to end-of-life is determined experimentally at a jounce pressure $þ_i$ different than previously used jounce pressures. For example, the number of cycles $N_1$ of a first copy of the gas spring assembly from beginning-of-life to end-of-life is determined experimentally at a first jounce pressure $þ_1$, and the number of cycles $N_2$ of a second copy of the gas spring assembly from beginning-of-life to end-of-life is determined experimentally at a second jounce pressure $þ_2$. After determining the number of cycles, α and β are solved in the following model using nonlinear regression.

$$N_i = -\alpha \ln þ_i + \beta,\ i = 1, \ldots, n$$

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used. Also, it will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus, it is to be distinctly understood that claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. An indicator of an estimated remaining life of an associated spring device, said indicator comprising:

at least one sensor operative to generate a signal having a relation to at least one of a usage condition and an environmental exposure condition of said spring device; and at least one processor programmed to:

receive said signals having a relation to at least one of a usage condition and an environmental exposure condition of the associated spring device from a first timing event to a second timing event;

derive data from said received signals; and, determine an estimated remaining life of the associated spring device using said data and an expression modeling a relationship between an estimated remaining life of the associated spring device and said at least one of a usage condition and an environmental exposure condition.

2. An indicator according to claim 1, wherein said at least one of a usage condition and an environmental exposure condition includes one or more of temperature, number of cycles and distance traveled.

3. An indicator according to claim 2, wherein the associated spring device is a gas spring having an associated gas pressure, and said at least one of a usage condition and an environmental exposure condition includes pressure.

4. An indicator according to claim 2, wherein the associated spring device has a longitudinal axis and during use the associated spring device can experience periods of axial displacement between compressed and extended conditions, and said distance traveled has a relation to an axial displacement of the associated spring device between the compressed and extended conditions.

5. An indicator according to claim 2, wherein the associated spring device has a longitudinal axis and during use the associated spring device can experience periods of axial displacement between compressed and extended conditions, and said number of cycles is one of:

a number of periods of compression of the associated spring device immediately followed by extension of the associated spring device; and, a number of periods of extension of the associated spring device immediately followed by compression of the associated spring device.

6. An indicator according to claim 1, wherein said at least one processor is programmed to derive data by generating a plurality of data samples from said received signals, and said at least one processor is programmed to determine an estimated remaining life using at least a portion of said plurality of data samples.

7. An indicator according to claim 6, wherein each data sample includes a sample period spanning from one of a beginning-of-life of the associated spring device event and a time of generating an immediately preceding data sample event to a time of generating said data sample.

8. An indicator according to claim 6, wherein said expression is:

$$\frac{\sum_{i=1}^{n} D_i}{D_{Life}} + \frac{\sum_{i=1}^{n} 2^{\left(\frac{\Delta T_i}{10}\right)}}{t_{Life}} = 1;$$

in which n is the number of data samples of said plurality of data samples; i is an index into said plurality of data samples; D is a distance traveled by the associated spring device; T is temperature of the associated spring device; $\Delta T_i=0$ where $T_i-T_{Ref}<0$ and $\Delta T_i=T_i-T_{Ref}$ otherwise; $T_{Ref}$ is temperature of a copy of the associated spring device during lab fatigue testing; $D_{Life}$ is a distance traveled by the copy of the associated spring device from a beginning-of-life event to an end-of-life event during the lab fatigue testing; and $t_{Life}$ is an estimate of total life for the associated spring device, the estimate ignoring fatigue life.

9. An indicator according to claim 6, wherein said expression is:

$$\frac{\sum_{i=1}^{n} N_i}{N_{Life}} + \frac{\sum_{i=1}^{n} 2^{\left(\frac{\Delta T_i}{10}\right)}}{t_{Life}} = 1;$$

in which n is the number of data samples of said plurality of data samples; i is an index into said plurality of data samples; N is number of cycles of the associated spring device; T is temperature of the associated spring device; $\Delta T_i=0$ where $T_i-T_{Ref}<0$ and $\Delta T_i=T_i-T_{Ref}$ otherwise; $T_{Ref}$ is temperature of a copy of the associated spring device during lab fatigue testing; $N_{Life}$ is number of cycles of the copy of the associate spring device from a beginning-of-life event to an end-of-life event during the lab fatigue testing; and $t_{Life}$ is an estimate of total life for the associated spring device, the estimate ignoring fatigue life.

10. An indicator according to claim 6, wherein the associated spring device is a gas spring having an associated gas pressure, and said expression is:

$$\sum_{i=1}^{n}\left(\frac{N_i}{(-\alpha \ln \text{þ}_i + \beta)_{T_{ref}}} * 2^{\frac{\Delta T_i}{10}}\right) = 1;$$

in which n is the number of data samples of said plurality of data samples; i is an index into said plurality of data samples; N is number of cycles of the associated spring device; þ is jounce pressure of the associated spring device; T is temperature of the associated spring device; $\Delta T_i=0$ where $T_i-T_{Ref}<0$ and $\Delta T_i=T_i-T_{Ref}$ otherwise; $T_{Ref}$ is temperature of a copy of the associated spring device during lab fatigue testing; and $\alpha$ and $\beta$ are experimentally determined constants relating estimated remaining life and jounce pressure.

11. A gas spring and indicator assembly comprising:

a gas spring including opposing end members and a flexible wall secured therebetween that at least partially defines a spring chamber; and, an indicator supported on one of said opposing end members, said indicator including at least one sensor operative to generate a signal having a relation to at least one of a usage condition and an environmental exposure condition of said gas spring and at least one processor communicatively coupled with said at least one sensor and programmed to:

receive signals from said at least one sensor;

derive data from said received signals; and, determine an estimated remaining life of at least said gas spring using said data and an expression modeling a relationship between an estimated remaining life of said gas spring and said at least one of a usage condition and an environmental exposure condition.

12. A gas spring and indicator assembly according to claim 11, wherein said indicator is at least partially disposed within said spring chamber, and said at least one sensor includes a plurality of sensors operative to generate signals having a relation to at least one of distance, acceleration, temperature and pressure.

13. A gas spring and indicator assembly according to claim 11, wherein said at least one of a usage condition and an environmental exposure condition include one or more of temperature, number of cycles, distance traveled and jounce pressure.

14. A suspension system of an associated vehicle having an associated sprung mass and an associated unsprung mass, said suspension system comprising:

a gas spring operatively disposed between the associated sprung mass and the associated unsprung mass; and, an indicator including at least one sensor operative to generate a signal having a relation to at least one of a usage condition and an environmental exposure condition and at least one processor communicatively coupled with said at least one sensor and programmed to:

receive signals from said at least one sensor;

derive data from said received signals; and, determine an estimated remaining life of at least said gas spring using said data and an expression modeling a relationship between an estimated remaining life of said gas spring and said at least one of a usage condition and an environmental exposure condition.

15. A suspension system according to claim 14, wherein said indicator is a first indicator, and said gas spring is a gas spring of a gas spring and indicator assembly with said gas spring and indicator assembly including a second indicator with said second indicator including at least one sensor operative to generate a signal having a relation to at least one of a usage condition and an environmental exposure condition of said gas spring and at least one processor communicatively coupled with said at least one sensor and programmed to:

receive signals from said at least one sensor;

derive data from said received signals; and, determine an estimated remaining life of at least said gas spring using said data and an expression modeling a relationship between an estimated remaining life of said gas spring and said at least one of a usage condition and an environmental exposure condition.

16. A suspension system according to claim 15, wherein said gas spring includes opposing end members and a flexible wall secured therebetween that at least partially defines a spring chamber, and said second indicator is supported on one of said opposing end members at least partially within said spring chamber.

17. A suspension system according to claim 15, wherein at least one of said first and second indicators includes a plurality of sensors operative to generate signals having a relation to at least one of distance, acceleration, temperature and pressure such that said at least one of a usage condition and an environmental exposure condition can include one or more of temperature, number of cycles, distance traveled and jounce pressure.

18. A method of determining an estimated remaining life of a spring device, said method comprising:

generating by at least one sensor operatively associated with said spring device a signal having a relation to at least one of a usage condition and an environmental exposure condition of said spring device;

receiving by at least one processor said signals having a relation to at least one of a usage condition and an environmental exposure condition from a first timing event to a second timing event;

deriving data from said signals using said at least one processor; and, determining using said at least one processor an estimated remaining life of the spring device using said data and an expression modeling a relationship between an estimated remaining life of the spring device and at least one of a usage condition and an environmental exposure condition.

19. A method according to claim 18, wherein said expression includes a relation to one or more of temperature, pressure, number of cycles and distance traveled.

20. A method according to claim 18 further comprising communicating an indication of an estimated remaining life to one of a device, a system and a user.

* * * * *